Feb. 23, 1926.　　　　　　　　　　　　　　　1,574,567
A. FLETTNER
DEVICE FOR STEERING AIRCRAFT
Filed June 29, 1920　　　8 Sheets-Sheet 1

Inventor:

Anton Flettner

Feb. 23, 1926. 1,574,567
A. FLETTNER
DEVICE FOR STEERING AIRCRAFT
Filed June 29, 1920  8 Sheets-Sheet 2

Inventor:
Anton Flettner

Feb. 23, 1926.

A. FLETTNER

DEVICE FOR STEERING AIRCRAFT

Filed June 29, 1920

Inventor:

Anton Flettner

Feb. 23, 1926.

A. FLETTNER

DEVICE FOR STEERING AIRCRAFT

Filed June 29, 1920

*Inventor:*
*Anton Flettner*

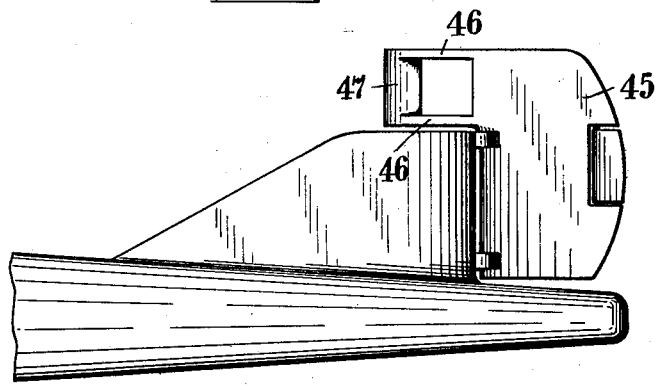

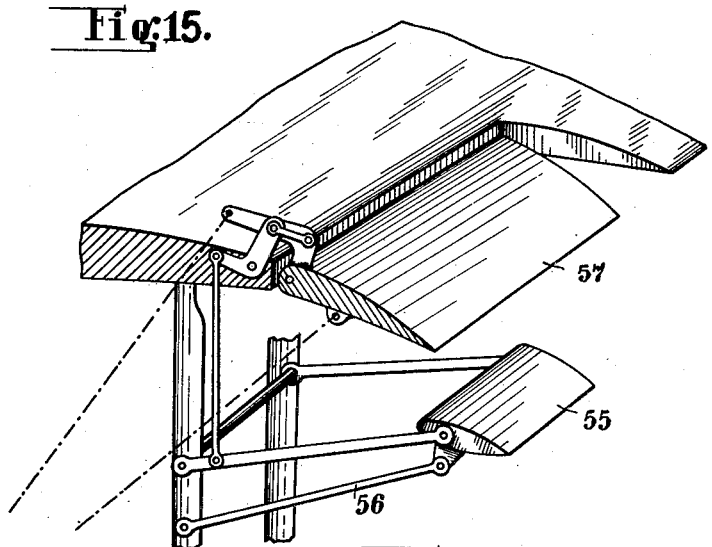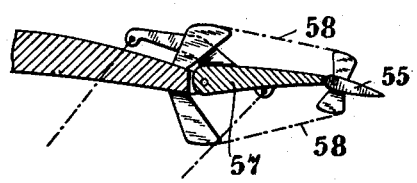

*Inventor:*
Anton Flettner

Patented Feb. 23, 1926.

1,574,567

UNITED STATES PATENT OFFICE.

ANTON FLETTNER, OF THE HAGUE, NETHERLANDS.

DEVICE FOR STEERING AIRCRAFT.

Application filed June 29, 1920. Serial No. 392,840.

(GRANTED UNDER THE PROVISIONS OF THE ACT OF MARCH 3, 1921, 41 STAT. L., 1313.)

*To all whom it may concern:*

Be it known that I, ANTON FLETTNER, a citizen of Germany, residing at The Hague, the Netherlands, have invented certain new and useful Improvements in Devices for Steering Aircraft (for which I have filed applications for patent in Germany on June 16, 1917; September 3, 1917; September 22, 1917; October 29, 1917; February 28, 1918; July 23, 1918; October 5, 1918; November 7, 1918), of which the following is a specification.

It has already been proposed to render the operation of the rudders of air-craft which, particularly in the case of big or giant flying-machines and airships, requires the expenditure of a considerable amount of force, more easy by balancing the surface pressure of the rudder by means of compensating surfaces, arranged in front of the axis of the rudder either within or without the place thereof. Compensating surfaces of this kind have also been adapted to be angularly adjustable relatively to the rudder, in order to fully utilize the wind pressure acting upon them for assisting the manual pressure exerted by the man actuating the rudder.

However, it has not yet been hitherto suggested to cause the pressure exerted by the driving wind to act by means of auxiliary planes immediately upon the arm of a lever disposed to the rear of the axis of the rudder. The reason for this may perhaps be sought in the fact that the forms of execution, which most readily suggest themselves in this case generally lead to the construction of auxiliary pressure surfaces, which have to be displaced in a direction running counter to that in which the rudder is to be turned in order to initiate this latter movement, and which surfaces, since they are disposed within the driving wind in a position opposed to that of the rudder, apparently considerably impair the efficiency of the steering action. In reality, however, this apparent drawback is more than counterbalanced by extraordinary advantages, which in themselves suffice to make the arrangement, whereby the auxiliary surface pressure comes to act on the rear end of the rudder axis, appear the only one possessing real practical utility. Moreover, while the constructions hitherto proposed merely led to short lever arms, and correspondingly slight auxiliary pressures, as these could exert their action only at a short distance from the rudder axis, it will be found that by altering the arrangement so that the auxiliary pressure is caused to act on the rudder axis as above explained, there will no longer exist any restriction whatever as to the length of the lever arm that may be employed, and upon which the pressure of the driving wind may be caused to act in order to turn the rudder.

For even by arranging the auxiliary pressure surface immediately at the rear edge of the rudder, there results a long lever arm, since the rudder, as a rule, is disposed entirely to the rear of its axis, while its centre of pressure, on the other hand, is lodged close to the axis. But even in cases, where the rudder is in part balanced by a portion of its surface being disposed in front of the axis, even the lever arm of an auxiliary pressure surface arranged say, immediately to the rear of the rear edge, will prove to be considerably longer than one disposed close to the front edge. As a matter of fact, in the case of all main rudders arranged immediately to the rear of the supporting plane or to the rear of a guiding surface, it is only by the application of my invention that the possibility is given of disposing the auxiliary pressure surface within the plane of the main rudder, thereby forming an arrangement which in all respects will be the most perfect imaginable. For only then can the auxiliary pressure surface be disposed within the air current, the direction of which depends on the particular position assumed by the main rudder. Thus, for example in the case of the rudder being in its extreme position, the auxiliary surface will be disposed parallel to the direction of flight, and will nevertheless be fully exposed to the pressure of the air current controlled by the rudder, and will consequently be entirely effective. Besides, the members serving for transmitting the power required to operate the auxiliary pressure surface, may be arranged to run through the rudder, since the said surface is disposed within the same plane as the rudder, and may lie close to the rear edge thereof. The possibility of any unfavourable change of direction of the air current owing to the formation of injurious eddies, such as are always bound to arise when the auxiliary surfaces are arranged in front of the rudder axis, immaterial whether this be within or outside of the plane of the rudder, is entirely excluded in the case of my improved arrangement.

Above all, there is the possibility of making the members serving for the transmission of power wholly independent of the rudder and its position, so that this latter is rendered freely movable, and is exclusively controlled by the auxiliary surface. And as this said surface has to take up only small pressures, the power transmission members may be made very light.

However, that most difficult problem which presents itself in connection with the auxiliary steering arrangement, and which consists in depriving the play of forces during the steering operation of its instability—a problem, the solution of which was simply impossible where the auxiliary planes were arranged in front of the axis—is now most successfully solved by means of my invention. For the centre of gravity of the forces is now disposed to the rear (in the direction of flight) of the turning axis of the system. Indeed, it is only by these means that the idea of providing an auxiliary steering arrangement could be realized practically.

In the drawings affixed to the specification and forming part thereof several forms of aeroplanes embodying my invention are illustrated diagrammatically by way of example.

In the drawings Figure 1 is a partial section of the wings of an aeroplane illustrating an elevating rudder with a second elevating rudder pivoted to it, this second rudder being adjusted by means of an auxiliary rudder.

Figure 14 is a side elevation of the tail end of an aeroplane body with a transversal rudder to which are attached an auxiliary rudder and a compensating surface.

Figure 15 is a perspective view partly in longitudinal section of the wing of an aeroplane with the main rudder hinged to it and an auxiliary rudder connected with the main rudder and hinged also to a fixed point of the machine.

Figure 16 is a cross section showing another form of the means for actuating the auxiliary rudder.

Figure 1:
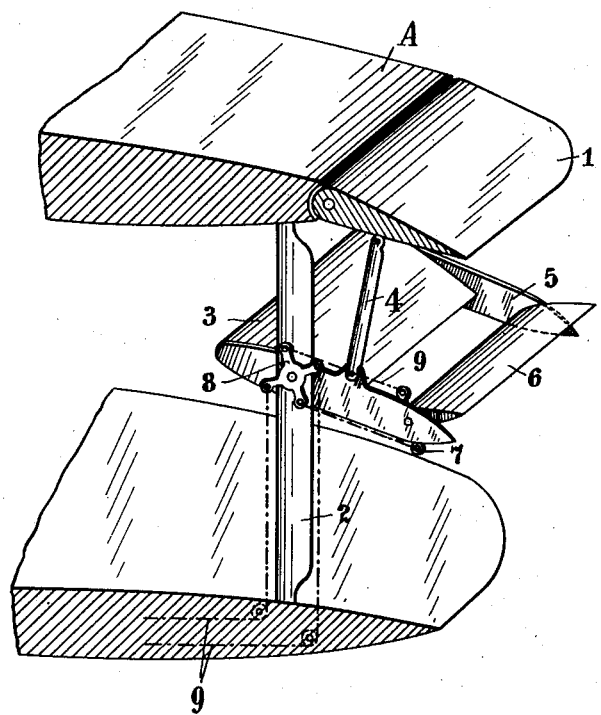

As shown for instance in Fig. 1 of the accompanying drawings, there is pivoted to the upper supporting plane A a horizontal rudder 1, to which another horizontal rudder 3, disposed between the supporting planes and pivoted to the struts 2, is connected by means of a link 4. Intermediate between the supporting arms 5 of rudder 3 there is pivoted the auxiliary rudder 6, which is operated from the pilot's seat by means of levers 7, levers 8, loosely mounted on the spindle of the main rudder, and lastly cables 9. On the auxiliary rudder being set in the position shown in the drawing, it is forced downwards by the air current, and thus causes the main rudders 1 and 3 to be turned downwards as well.

Figure 2:
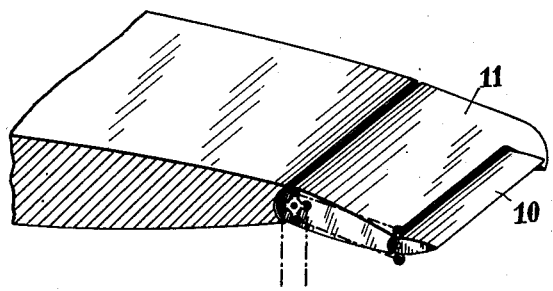
Figure 2 is a similar view of the wing of an aeroplane with elevating rudder to the rear edge of which an auxiliary rudder is directly hinged.

Fig. 2 discloses the arrangement of the auxiliary rudder 10 immediately at the rear edge of the main rudder 11.

Now it has been found by experience that special contrivances or devices are required to enable the main rudder to be always set exactly in the angular position desired by the man attending to the rudder. For this could only then be directly obtained, if it were possible to nicely counter-balance the pressure of the auxiliary rudder relatively to the counterpressure exerted by the main rudder, in other words, on it being possible to determine with absolute exactitude the size and proportions of the main rudder relatively to those of the auxiliary rudder. A further condition would be that the pressure acting on the surface of the main rudder in the case of a uniform increase of the angle of inclination, would augment to the same extent as the pressure exerted on the surface of the auxiliary rudder. In addition, the fact would have to be considered that in the case of a balanced rudder, owing to the centre of pressure being disposed in front of the axis at the commencement of the steering operation, the rudder is in an unstable equipoise, and that the auxiliary rudder, when the main rudder begins its deflection, in order to prevent this latter from tilting, would have to act almost directly counter to the main rudder, and to assume its proper position only after the main rudder has assumed a certain angular position, i. e. after the centre of pressure has shifted to the rear of the rudder axis, the auxiliary rudder then effecting or, at least, assisting the deflection of the main rudder in the direction desired, and securing it in this position.

Now to retain the main rudder in the position desired is again a problem which required particular attention. For during the flight, and in particular during the steering operation, changes in the air current, and consequently fluctuations of pressure, are liable to occur, which will continually create alternations in the position of the rudder.

Now all these drawbacks can only be removed by means of an arrangement which, relatively to the counterbalancing of the pressures acting on the rudder, as also relatively to the attention which must be paid to the mutual change of the forces acting both on the main rudder, as well as on the auxiliary rudder, will only make slight demands upon the ingenuity of the constructing engineer, while at the same time it will restrict, as far as possible the necessity of maintaining an exact consonance or of keeping up a certain proportion between the position and the size of the auxiliary rudder and that of the main rudder.

Figure 3:
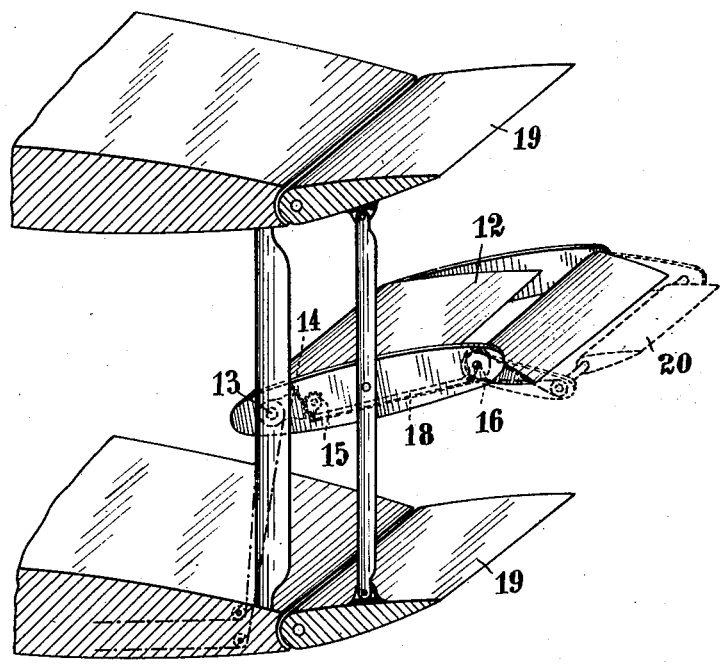
Figure 3 is a view similar to the one shown in Figure 1 in which however the auxiliary rudder is shown as being actuated by means of two segments.

An arrangement of this kind is shown in a purely diagrammatic manner, by way of illustration, in Fig. 3. The main rudder 12, which is freely movable, supports on its spindle 13 a toothed segment 14 which meshes with a toothed segment 15 likewise lodged on the rudder. The segment 15 is connected at one side by means of a link 18 to a crank arm 16 mounted on the spindle of the auxiliary rudder 17. To the main rudder 12 there are furthermore coupled two additional main rudders 19.

The steering operation is as follows: on the segment 14 being oscillated, say, for example, through an angle of 2°, and, provided the diameters of the toothed segments 14, 15 be, for example, in a proportion of 4:1 relatively to each other, then the smaller segment 15, and therewith the auxiliary rudder 17 connected to it, will be oscillated through an angle of 8°. The rudder 17 is thus placed under pressure and causes the deflection of the main rudder 12. Since, however, the toothed segment 15 simultaneously rolls on the toothed segment 14, it follows, that on the main rudder being oscillated, the auxiliary rudder is self-actingly rotated back into its initial position, and this so far until the forces are balanced.

A similar result would have been obtained if the relative proportion of the diameters of the toothed segments had been fixed at the value 1 or thereunder. For also in that case on a deflection of the main rudder, the auxiliary rudder would be rotated back, as above explained. The advantage of the larger proportion resides primarily in the fact that on the steering action being initiated there is attained an excess of steering power on the part of the auxiliary rudder which offers a security for the fact that the main rudder will reliably assume the position required. This excess of power counteracts moreover most advantageously the possibility of the main rudder oscillating too far outward.

For the instant the deflection of the main rudder were to exceed the predetermined limit, the segment 15 would continue to roll along segment 14, causing thereby the auxiliary rudder to effect a powerful oscillation, and to assume a position in which it would be able to successfully counteract any further movement on the part of the main rudder.

The like will always take place whenever the main rudder should try, for any reason whatsoever, to depart from the position in which it has been placed, including the neutral position. In the event of an unintentional movement on the part of the main rudder, whereby it might be deflected, say, for about 2°, the auxiliary rudder is shifted for 8° into the counterpressure position. The rudders will for these reasons attain and retain with the utmost exactitude the position which they are to assume.

In the case of such an arrangement the auxiliary rudder may again be controlled by a still smaller auxiliary rudder, adapted to be operated about the axis of the main rudder, across this rudder itself, and finally about the axis of the first auxiliary rudder, as disclosed in dotted lines, in Fig. 3. In this arrangement, the second auxiliary rudder 20 alone is positively actuated, and the first auxiliary rudder 17 is now as freely movable as the main rudder 12, while the eccentric disc 16 is mounted loosely on its spindle, and transmits its motion, by means of a rope 21, onto the axis of the second auxiliary rudder 20. On this latter being set upwards, it forces the first auxiliary rudder 17 downwards, which for its part again forces the main rudder 12 upwards. In an arrangement comprising a plurality of auxiliary rudders, the first, third, etc. will adjust themselves in a position running counter to that of the main rudder, whereas the second, fourth, etc. will assume the same position as the main rudder.

In the place of toothed segments it is obvious that also toothed couplings, a system of levers, rope or chain transmissions, etc. may be employed to equal advantage.

Figure 4:
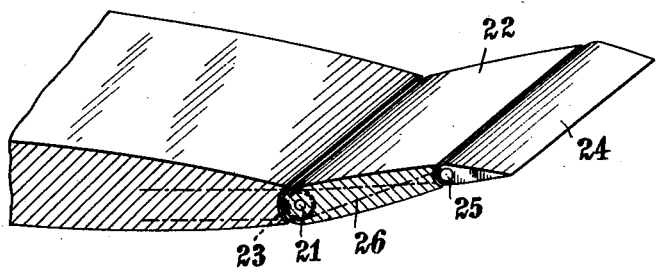
Figure 4 is a view similar to the one shown in Figure 2 in which however the auxiliary rudder is actuated by means of cross-ropes or cables.

A rope transmission of this kind is illustrated by way of example in Fig. 4. On the spindle 21 of the main rudder 22 there is mounted a rope pulley 23, and on the spindle of the auxiliary rudder 24 a pulley 25, over the pulleys 23 and 25 there is placed crosswise a rope 26.

Figure 5:
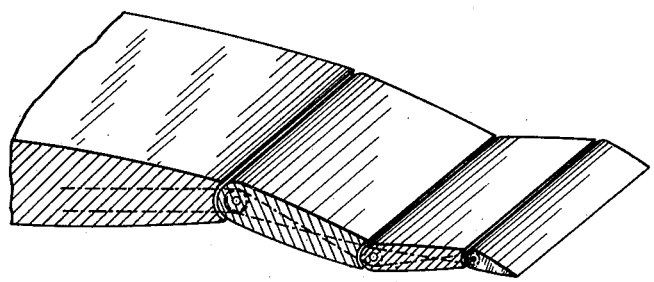
Figure 5 is an illustration resembling Figure 4 in which however two auxiliary rudders mounted in series are arranged at the rear edge of the main rudder.

In Fig. 5 the rope transmission is shown in connection with an arrangement comprising two auxiliary rudders connected the one to the rear of the other.

Figure 6:
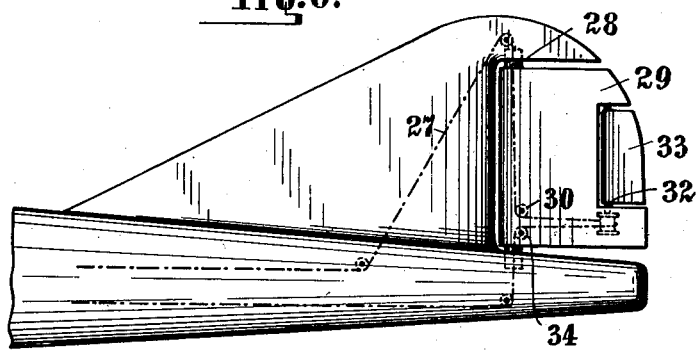
Figures 6 and 7 are side elevations of the tail of an aeroplane body showing an auxiliary rudder connected with the main transversal rudder, the means for actuating the rudder extending in the direction of and around the main rudder axis respectively.

A further form of execution in which the rope transmission arrangement is employed in connection with a vertical rudder is shown in Fig. 6. In this case the rope 27 is run through the hollow spindle 28 of the main rudder 29 and, by means of the guide roller 30, across to the stationary spindle 32 of the auxiliary rudder 33, and then back across the guide roller 34.

Figure 7:
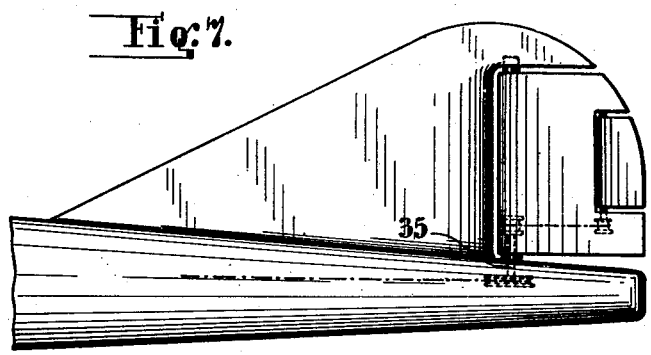

The arrangement shown in Fig. 7 differs from that according to Fig. 5 solely by the fact that, in the place of the cable, a pulley shaft 35 is run through the hollow spindle of the main rudder.

The auxiliary rudder may be operated by mechanical means directly from the pilot's seat. However driving gear of any other kind, such for example as are operated by liquid pressure, electricity, or the like, may be employed to equal advantage. It will be found expedient to take due care that the driving members at the pilot's seat and at the other places execute similar and equally large movements. The driving power required may either be produced manually, or else it may be supplied by any source whatsoever which the man at the rudder may interconnect when required. The transmission of power may either be carried through right up to one of the auxiliary rudders, or else it may be adapted to operate a device lodged on the spindle of the main rudder, preferably provided with a self-locking contrivance and actuating an auxiliary rudder by the aid of mechanical coupling devices, such as have been hereinbefore described.

If desired, there may be coupled to the spindle of the main rudder two contacts or series of contacts, intermediate which there is arranged a switch lever. On the switch lever being moved across the one row of contacts, then, for example, a motor arranged at the main rudder is set in motion, and which, by aid of the auxiliary rudder, will cause the deflection of the main rudder in the like direction. As the main rudder attains its predetermined position, it rotates the row of contacts away from below the switch lever, whereby this latter again assumes its initial (central) position between the contacts, and the motor is then switched out. In the place of a motor, use may also be made of a magnet for the purpose specified, and instead of an electrical device, a pneumatic or hydraulic device may be employed with equal advantage.

Figure 8:
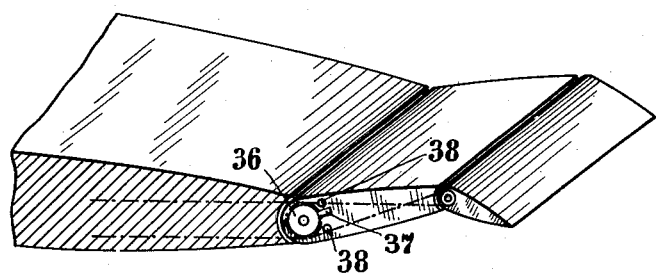
Figure 8 is an illustration similar to Figure 1 of a main rudder and auxiliary rudder with stops limiting the movement of the auxiliary rudder.

If it be further desired to directly act upon the freely movable main rudder, then the movements of the power transmission members, which are disposed co-axially to the main rudder axis, may be restricted in a suitable manner relatively to the main rudder, even as disclosed in Fig. 8 by way of example by the projection 37 fitted on to the disc 36, and the stops 38 provided on the main rudder.

In order to prevent vibrations from arising, the rudders may be braked or locked, say by means of brake devices. A brake arrangement of this kind would preferably have to be so devised that it would be enabled to automatically release the rudder when this latter would have to effect a movement, and to again enter into action as soon as the rudder had attained the required position.

Figure 9:
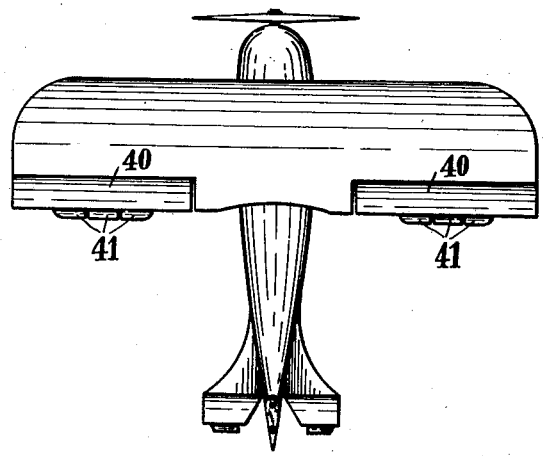
Figure 9 is a plan view of an aeroplane with a main rudder on each side of the wing and three juxtaposed auxiliary rudders hinged to each main rudder.
Figure 10:
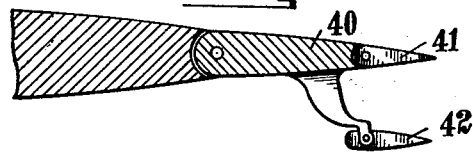
Figure 10 is a longitudinal section showing a main rudder with two auxiliary rudders arranged one above the other.
Figure 11:
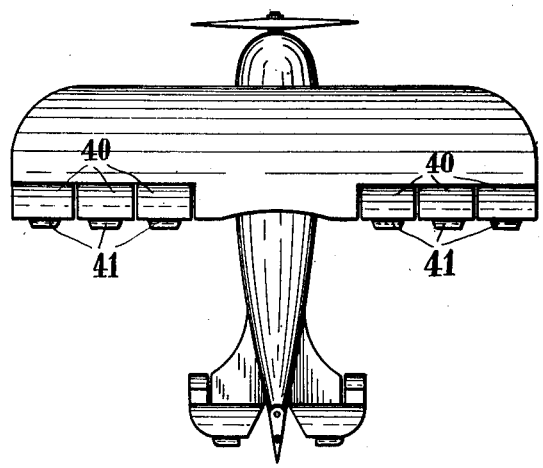
Figure 11 is a plan view of an aeroplane with three main rudders arranged on either side of the wing and an auxiliary rudder attached to each main rudder.

For certain purposes it may prove of importance to provide the main rudder with a special auxiliary rudder for every steering direction. Besides, from motives of safety, it may be found expedient to arrange a plurality of uniformly acting auxiliary rudders in a plane either adjoining side by side or one above the other, or else in different planes altogether, as shown diagrammatically in Figs. 9 and 10, in which 40 denotes the main rudder and 41 and 42, respectively, the auxiliary rudders. However, the auxiliary rudder itself may be again subdivided into a number of sections, each of which for its part may be actuated by one or a plurality of auxiliary rudders (Fig. 11).

To minimize the formation of eddies at the edge, and further to obtain the greatest possible differences of pressure, there may be arranged planes transversely to the rudder, and this either at the rudder itself or else (as, for example in the case of a vertical rudder) above or below the same.

Figure 12:
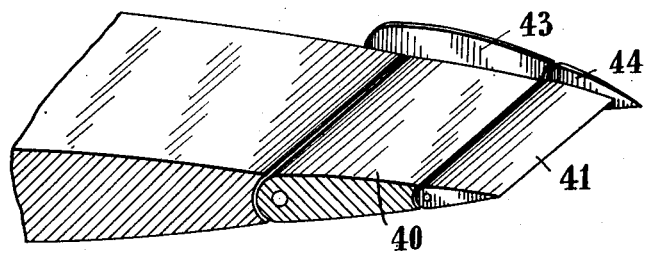
Figure 12 is a longitudinal section showing lateral protection surfaces mounted sideways of the main and auxiliary rudders.

Additional surfaces of this kind are denoted by the numerals 43 and 44 in Fig. 12.

Figure 13:
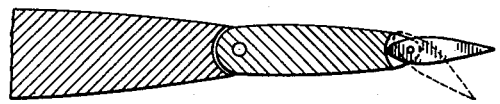
Figure 13 is a longitudinal section showing the front portion of the auxiliary rudder movably arranged in a cut out portion of the main rudder.

Suitably, both the main, as also the auxiliary rudders may be balanced. In such a contingency a form of construction for the auxiliary rudder, such as is shown by way of illustration in Fig. 13, will prove advantageous. For in this case the front edge of the auxiliary rudder, on being deflected, will not pass beyond the edge of the main rudder.

It may further appear desirable to so dispose the axis of the main rudder that this latter, provided there were no auxiliary rudders arranged would have to be considered as being overbalanced up to within the proximity of the extreme position, or even in that position. Now, by the provision of an auxiliary rudder in the case of such an arrangement, not only is the possibility of overbalancing obviated, but in addition the control action of the main rudder is enhanced.

Figs. 15 and 16 disclose two forms of execution in the case of which the auxiliary rudder is no longer directly operated by the operator, its movement being made dependent upon that of the main rudder, the deflection of which, while being effected in the customary manner is facilitated by the action of the auxiliary rudder. In the case of the form of execution according to Fig. 15, the auxiliary rudder 55 is connected to the body of the air craft by means of a link 56, and, on the main rudder 57 being lowered, it is oscillated in such a manner as to enable it to assist the motion of the main rudder. In the form of execution shown in Fig. 16 the coupling of the auxiliary rudder to the body of the air craft is effected by means of a rope or cable 58.

Figure 17:
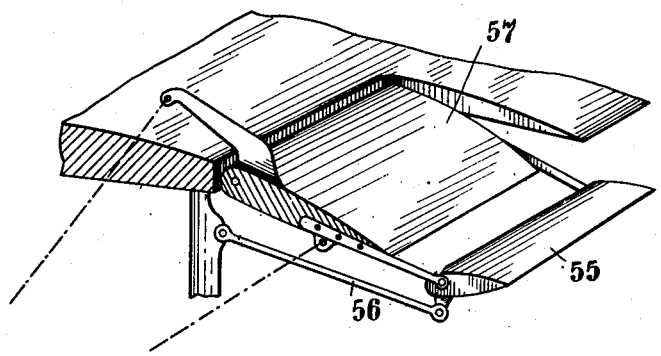
Figure 17 is a view resembling Figure 15 in which the auxiliary rudder is shown as being directly attached to the main rudder and further hinged to a fixed point of the aeroplane.

Fig. 17 discloses a modification of the form of structure shown in Fig. 15, in the case of which the auxiliary rudder is pivoted to long lever arms arranged on the main rudder.

Figure 18:
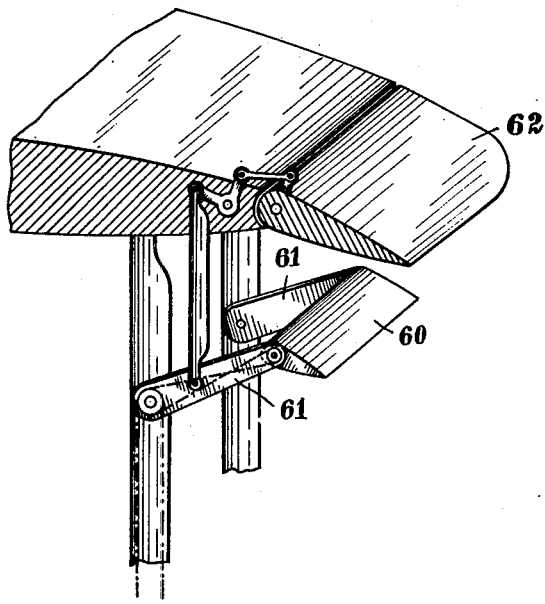
Figure 18 is a similar view showing another way of connecting the auxiliary rudder with the main rudder and the body of the machine.

The arrangement according to Fig. 18 shows the auxiliary rudder 60 pivoted to special lever arms 61, which for their part are coupled to the main rudder 62 in such a manner that they will move in a contrary direction to this latter. By these means, the advantage is obtained that the auxiliary rudder, while the main rudder is being operated, will not move counter to the same but rather along the same direction, and will thus increase the efficiency of the main rudder. It will be at the same time obvious from what has been said, that there is no need for arranging the auxiliary rudder immediately at the main rudder, but that it may as well be pivoted to levers, disposed at any other part of the craft and connected to the main rudder by means of rods, cables, or the like.

By way of precaution and as a protection for the auxiliary rudder, protective surfaces may be arranged at the main rudder adapted to project beyond the auxiliary rudder in such a manner, that this latter will be secured against any injury to the greatest extent possible. These protective surfaces again may be connected by means of planes disposed in a line parallel to the auxiliary rudder in such wise that the auxiliary rudder will be practically surrounded by a protective casing of protective channel. A protection of this kind will prove particularly valuable in a case where a plurality of auxiliary rudders are connected in a series, i. e. one behind the other, and where the last, which is operated directly, is very small. These said surfaces may then be of such small dimension as to enable them to be acted upon by the slight force exerted by a gyroscopic device such as is the case when employing a gyroscopic steering or balancing arrangement.

The weight of the rudders may be counterbalanced by means of special auxiliary devices. To this end, springs may be employed by aid of which the rudders are suspended by means of their free edges to either fixed or movable sections of the air craft.

I claim:

1. In a steering device for aircraft in combination, a rudder, an auxiliary pressure surface pivoted to said rudder near the rear edge thereof and gearing inserted between said rudder and said surface whereby this latter is caused, under the influence of the forces of flow acting thereon, to further the movement of said rudder.

2. In a steering device for aircraft in combination, a rudder, an auxiliary pressure surface pivoted to said rudder close to the rear edge and in the plane of said rudder and gearing inserted between said rudder and said surface whereby this latter is caused, under the influence of the forces of flow acting thereon, to further the movement of said rudder.

3. In a steering device for aircraft in combination, a rudder, a plurality of auxiliary pressure surfaces pivoted to said rudder near the rear edge thereof and gearing inserted between said rudder and said surfaces whereby these latter are caused, under the influence of the forces of flow acting thereon, to further the movement of said rudder.

4. In a steering device for aircraft in combination, a rudder, a plurality of auxiliary pressure surfaces pivoted in series to said rudder near the rear edge thereof and gearing inserted between said rudder and said surfaces whereby these latter are caused, under the influence of the forces of flow acting thereon, to further the movement of said rudder.

5. In a steering device for aircraft in combination, a rudder, a plurality of auxiliary pressure surfaces pivoted to the rear edge of said rudder and gearing inserted between said rudder and said surfaces whereby these latter are caused, under the influence of the forces of flow acting thereon, to further the movement of said rudder.

6. In a steering device for aircraft in combination, a rudder, a plurality of auxiliary pressure surfaces pivoted in series to the rear edge of said rudder and gearing inserted between said rudder and said surfaces whereby these latter are caused, under the influence of the forces of flow acting thereon, to further the movement of said rudder.

7. In a steering device for aircraft in combination, a rudder, a first auxiliary pressure surface pivoted near the rear edge of said rudder, a second auxiliary pressure surface pivoted near the rear edge of said first auxiliary pressure surface and gearing inserted between said rudder and said surfaces whereby these latter are caused, under the influence of the forces of flow acting thereon, to further the movement of said rudder.

8. In a steering device for aircraft in combination, a rudder, a first auxiliary pressure surface pivoted to the rear edge of said rudder, a second auxiliary pressure surface pivoted to the rear edge of said first auxiliary pressure surface and gearing inserted between said rudder and said surfaces whereby these latter are caused, under the influence of the forces of flow acting thereon, to further the movement of said rudder.

9. In a steering device for aircraft in combination, a rudder, an auxiliary pressure surface pivoted to said rudder near the rear edge thereof and means for operating said auxiliary surface comprising a member disposed coaxially to and adapted to rotate about the pivot of said rudder.

10. In a steering device for aircraft in combination, a rudder, a first auxiliary pressure surface pivoted near the rear edge of said rudder, a second auxiliary pressure surface pivoted near the rear edge of said first auxiliary pressure surface and means for operating said second auxiliary surface comprising a member disposed coaxially to and adapted to rotate about the pivot of said rudder.

11. In a steering device for aircraft in combination, a rudder, an auxiliary pressure surface pivoted to said rudder near the rear edge thereof, means adapted to be operated from the aircraft for directly actuating said surface, so as to cause it to deflect said rudder, said means comprising a member disposed coaxially to and adapted to rotate about the pivot of said rudder and means comprising a connection between said actuating means and said surface, on the one hand, and between said rudder and said surface, on the other hand for operating said auxiliary surface in such manner as to cause it to automatically move back in the direction of the normal position as said rudder is being oscillated.

12. In a steering device for aircraft in combination, a rudder, a plurality of auxiliary pressure surfaces pivoted in series near the rear edge of said rudder, means adapted to be operated from the aircraft for directly actuating said surface, so as to cause it to deflect said rudder, said means comprising a member disposed coaxially to and adapted to rotate about the pivot of said rudder and means comprising a connection between said actuating means and said surface, on the one hand, and between said rudder and said surface, on the other hand, for operating the last one of said surfaces in such manner as to cause it to automatically move back in the direction of the normal position as said rudder is being oscillated.

13. In a steering device for aircraft in combination, a rudder, an auxiliary pressure surface pivoted to said rudder near the rear edge thereof means adapted to be operated from the aircraft for directly actuating said surface, so as to cause it to deflect said rudder, said means comprising a member disposed coaxially to and adapted to rotate about the pivot of said rudder and means comprising a connection between said actuating means and said surface, on the one hand, and between said rudder and said surface, on the other hand for operating said auxiliary surface in such manner as to cause it to automatically move back in the direction of the normal position and to counteract undesirable movements of said rudder as said rudder is being oscillated.

14. In a steering device for aircraft in combination, a rudder, a plurality of auxiliary pressure surfaces pivoted in series near the rear edge of said rudder means adapted to be operated from the aircraft for directly actuating said surface, so as to cause it to deflect said rudder, said means comprising a member disposed coaxially to and adapted to rotate about the pivot of said rudder and means comprising a connection between said actuating means and said surface, on the one hand, and between said rudder and said surface, on the other hand for operating the last one of said surfaces in such manner as to cause it to automatically move back in the direction of the normal position and to counteract undesirable movements of said rudder as said rudder is being oscillated.

In testimony whereof I affix my signature.

ANTON FLETTNER.